US012577970B2

(12) United States Patent
Kreutmayr et al.

(10) Patent No.: US 12,577,970 B2
(45) Date of Patent: Mar. 17, 2026

(54) METHOD OF FORMING A QUADRANT CONTROL VALVE SYSTEM, QUADRANT CONTROL VALVE SYSTEM AND HYDRAULIC SYSTEM

(71) Applicant: HAWE Hydraulik SE, Aschheim (DE)

(72) Inventors: Fabian Kreutmayr, Aschheim (DE); Markus Imlauer, Aschheim (DE)

(73) Assignee: HAWE Hydraulik SE, Aschheim (DE)

( * ) Notice: Subject to any disclaimer, the term of this patent is extended or adjusted under 35 U.S.C. 154(b) by 0 days.

(21) Appl. No.: 19/228,219

(22) Filed: Jun. 4, 2025

(65) Prior Publication Data

US 2026/0002554 A1     Jan. 1, 2026

(30) Foreign Application Priority Data

Jun. 27, 2024     (DE) ..................... 10 2024 206 025.9

(51) Int. Cl.
*G05B 13/02*          (2006.01)
*F15B 19/00*          (2006.01)
(52) U.S. Cl.
CPC .......... *F15B 19/007* (2013.01); *G05B 13/027* (2013.01)
(58) Field of Classification Search
CPC ............................ F15B 19/007; G05B 13/027
See application file for complete search history.

(56) References Cited

U.S. PATENT DOCUMENTS 12,055,124 B1 * 8/2024 Guo ........................... F04B 1/06
2007/0252098 A1   11/2007 Schmidt 2007/0265746 A1   11/2007 Fulks
2012/0216746 A1 * 8/2012 Schneider .......... B65G 49/0459
                                                                   118/500
2013/0074487 A1 * 3/2013 Herold .................... F04B 17/00
                                                                   60/455
2022/0010821 A1 * 1/2022 Opperwall ............ F15B 19/002

FOREIGN PATENT DOCUMENTS

CN          102420552 A       4/2012
CN          111396400 A       7/2020
CN          114483563 A       5/2022
CN          115202327 A      10/2022
(Continued)

OTHER PUBLICATIONS

Heeger, Thomas, Samuel Kärnell, and Liselott Ericson. "Challenges for multi-quadrant hydraulic piston machines." Energy Conversion and Management: X 22 (2024): 100578. (Year: 2024).*
(Continued)

*Primary Examiner* — Christopher E. Everett
(74) *Attorney, Agent, or Firm* — DINSMORE & SHOHL LLP

(57)                ABSTRACT

A method of forming a quadrant control valve system for a hydraulic system is provided. The quadrant control valve system comprises at least one control valve assembly comprising at least one control valve, an electronic valve controller and a control valve sensor system. The method essentially comprises steps of automated quadrant-based load case analysis, automated circuit diagram synthesis and automated controller synthesis as well as implementation of the synthesized circuit diagram and implementation of the synthesized controller.

14 Claims, 6 Drawing Sheets

(56) References Cited

FOREIGN PATENT DOCUMENTS

| | | | |
|---|---|---|---|
| CN | 116717516 | A | 9/2023 |
| DE | 10138389 | A1 | 2/2003 |
| DE | 102014115364 | A1 | 4/2016 |
| DE | 102021204544 | A1 | 11/2022 |
| EP | 2203791 | B1 | 6/2012 |
| EP | 2148958 | B1 | 12/2012 |
| WO | 2021077950 | A1 | 4/2021 |
| WO | 2021191494 | A1 | 9/2021 |

OTHER PUBLICATIONS

Costa, Gustavo Koury, and Nariman Sepehri. "Four-quadrant analysis and system design for single-rod hydrostatic actuators." Journal of Dynamic Systems, Measurement, and Control 141.2 (2019): 021011. (Year: 2019).*

Zhang, S.; Li, S.; Minav, T. Control and Performance Analysis of Variable Speed Pump-Controlled Asymmetric Cylinder Systems under Four-Quadrant Operation. Actuators 2020, 9, 123. (Year: 2020).*

Pedersen, NH, Johansen, P, & Andersen, TO. "Four Quadrant Hybrid Control Oriented Dynamical System Model of Digital Displac Units." Proceedings of the BATH/ASME 2018 Symposium on Fluid Power and Motion Control. BATH/ASME 2018 Symp. on Fluid Power and Motion Control. Bath, UK. Sep. 12-14, 2018. (Year: 2018).*

* cited by examiner

METHOD OF FORMING A QUADRANT CONTROL VALVE SYSTEM, QUADRANT CONTROL VALVE SYSTEM AND HYDRAULIC SYSTEM

CROSS REFERENCE TO RELATED APPLICATION

This application claims the priority benefit from German Patent Application No. 10 2024 206 025.9, filed on Jun. 27, 2024, the entire contents of which is incorporated herein by reference in its entirety.

FIELD

The present disclosure relates to a method of forming a quadrant control valve system, a quadrant control valve system and a hydraulic system.

BACKGROUND

Various control valve systems for controlling hydraulic consumers, such as hydraulic cylinders or hydraulic motors, in hydraulic systems are known from the state of the art. Modern control valve systems have a control valve arrangement for each hydraulic consumer to be controlled, a control valve sensor system and an electronic valve controller. Each control valve arrangement comprises at least one electromagnetically or electrohydraulically actuated control valve. The electronic valve controller usually comprises a controller for the control valve arrangement(s), whereby the controller is implemented as software in the electronic valve controller. Both a common controller for all control valve arrangements and a separate controller for each control valve arrangement can be provided. The sensor data from the control valve sensor system is used to control the variables to be adjusted. The control valve sensor system can consist of sensors distributed across the hydraulic system and the control valve system (for example pressure sensors, volume flow sensors, temperature sensors or similar sensors), which are provided as separate components.

Such control valve systems are specifically configured for the respective application, i.e. the hydraulic system to be controlled or the hydraulic consumer(s) to be controlled. The implementation of such control valve systems involves a high level of individual development effort, which increases with the increasing complexity of the hydraulic systems to be controlled as well as increasing requirements for precision and stability in the operating points to be controlled.

Furthermore, with regard to increasingly required functionalities such as anomaly detection, condition monitoring or predictive maintenance, it is also necessary to provide control valve systems that can adaptively implement these functionalities.

SUMMARY

A method of forming a quadrant control valve system for a hydraulic system is provided. In one aspect, the hydraulic system comprises at least one hydraulic consumer which is controlled via the quadrant control valve system. The quadrant control valve system comprises a control valve arrangement for each hydraulic consumer of the hydraulic system to be controlled, a control valve sensor system and an electronic valve controller, where each control valve arrangement comprises at least one control valve.

In one aspect, the method comprises the following steps:

performing an automated quadrant-based load case analysis of the entire hydraulic system to be controlled on the basis of requirement data of the hydraulic system;

performing a hydraulic diagram synthesis for the quadrant control valve system based on the quadrant-based load case analysis, wherein the hydraulic diagram synthesis comprises a role assignment for each control valve of each control valve assembly based on the quadrant-based load case analysis;

performing a controller synthesis for the quadrant control valve system based on the synthesized circuit diagram and role assignment;

implementing the synthesized circuit diagram of the quadrant control valve system; and implementing the synthesized controller in the electronic valve control of the quadrant control valve system.

In one aspect, the result of the automated quadrant-based load case analysis reflects all load cases occurring in the hydraulic system and all transitions between the load cases in each case in a four-quadrant field per hydraulic consumer, whereby the four quadrants each represent a unique combination of positive or negative load and positive or negative movement of the corresponding hydraulic consumer.

In one aspect, the hydraulic system comprises at least two hydraulic consumers which are operated exclusively sequentially and an automated load case analysis is carried out separately for each hydraulic consumer.

In another aspect, the hydraulic system comprises at least two hydraulic consumers which are operated in parallel, where an automated load case analysis is carried out separately for each hydraulic consumer and an automated load case analysis is additionally carried out for each case in which at least two hydraulic consumers are operated in parallel.

In one aspect, the circuit diagram synthesis is performed automatically and includes automated selection of a number of required control valves for each control valve arrangement.

In one aspect, each control valve is an electromagnetically actuated 2/2-way control valve and each control valve arrangement comprises at least two control valves.

In some aspects, the requirement data of the hydraulic system comprise measurement data and/or simulation data.

In one aspect, the method further comprises the following subsequent steps:

reading out of sensor data recorded and stored during operation of the quadrant control valve system and optimizing the role assignment of the individual control valves and the synthesized controller based on the recorded and stored sensor data.

In some aspects, the subsequent steps of reading out and optimizing are carried out automatically during operation of the quadrant control valve system.

In some aspects, the automated steps of the method are computer-based using machine learning methods and the machine learning methods include convolutional neural networks, transformer models, recurrent neural networks and/or knowledge-based methods.

A quadrant control valve system for a hydraulic system is also provided in the present disclosure. The quadrant control valve system is formed according to the presently disclosed method. In one aspect, the hydraulic system comprises at least one hydraulic consumer which is controlled via the quadrant control valve system. The quadrant control valve system comprises a control valve arrangement for each hydraulic consumer of the hydraulic system to be controlled, a control valve sensor system and an electronic valve controller.

In one aspect, the quadrant control valve system further comprises a memory unit in which the sensor data recorded by the control valve sensor system during operation of the quadrant control valve system is stored.

Also disclosed is a hydraulic system comprising at least one hydraulic consumer and a quadrant control valve system according to the present disclosure.

DETAILED DESCRIPTION

Figure 1:
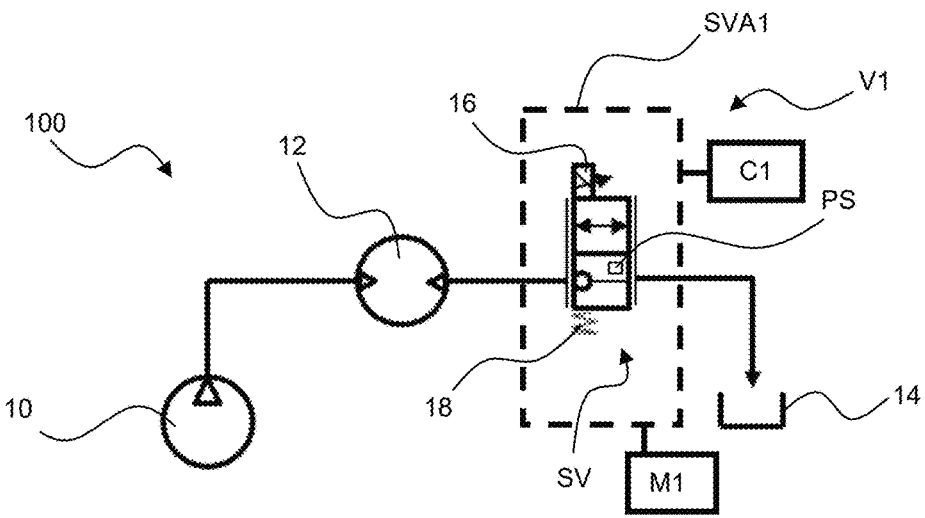
FIG. 1 shows a circuit diagram of a hydraulic system according to a first exemplary embodiment.

One object of the present disclosure is to provide a holistic approach for implementing an adaptive, self-learning control valve system that is as automated as possible.

The solution to the problem is achieved first of all with a method according to the present disclosure for forming a quadrant control valve system for a hydraulic system according to the embodiments of the present disclosure.

Furthermore, the solution to the problem is achieved with a quadrant control valve system according to the embodiments of the present disclosure.

According to the disclosure, a method for forming a quadrant control valve system for a hydraulic system is provided. The hydraulic system comprises at least one hydraulic consumer which is controlled via the quadrant control valve system. The quadrant control valve system comprises a control valve arrangement for each hydraulic consumer of the hydraulic system to be controlled, a control valve sensor system and an electronic valve controller, wherein each control valve arrangement comprises at least one control valve. The method comprises the following steps:

performing an automated quadrant-based load case analysis of the entire hydraulic system to be controlled on the basis of requirement data of the hydraulic system;

performing a hydraulic diagram synthesis for the quadrant control valve system based on the quadrant-based load case analysis, wherein the hydraulic diagram synthesis comprises a role assignment for each control valve of each control valve assembly based on the quadrant-based load case analysis;

performing a controller synthesis for the quadrant control valve system based on the synthesized hydraulic diagram and the role assignment;

implementing the synthesized hydraulic diagram of the quadrant control valve system; and implementing the synthesized controller in the electronic valve control of the quadrant control valve system.

In some aspects, the hydraulic diagram synthesis, the role assignment and/or the controller synthesis are also carried out automatically.

The control valve sensor system basically comprises sensors (e.g. pressure, flow rate and/or temperature sensors) for all variables required for controlling the variables to be regulated (e.g. pressure, flow rate). In one aspect, each control valve comprises at least one integrated fluid sensor, which is part of the control valve sensor system. A fluid sensor is understood to be any type of sensor that measures a hydraulic fluid parameter relevant for controlling the variables to be regulated.

The forming of a control valve system is understood here to mean both the hardware implementation of hydraulic circuit diagrams and the software implementation of the necessary control and regulation programs in the electronic valve control.

A quadrant control valve system is a control valve system that is based on a quadrant-based load case analysis.

A quadrant-based load case analysis is the assignment of all load cases occurring in the hydraulic system to a four-quadrant field per hydraulic consumer. A four-quadrant field defines the possible movement and load directions of an individual hydraulic consumer. Thus, depending on the load cases actually occurring at the respective hydraulic consumer, there are actually operating points in different numbers of quadrants of the respective four-quadrant field that correspond to the load cases occurring for this particular hydraulic consumer. From such a quadrant-based load case analysis, conclusions can be drawn about the quadrant control valve system required for the hydraulic system to be controlled. The quadrant-based load case analysis is automated, for example using a lookup table, a library or machine learning methods.

In the present case, a quadrant control valve system also means a control valve system which, depending on the requirements of the hydraulic consumer to be controlled, comprises one, two or four control valves in a control valve arrangement for a hydraulic consumer. Such a quadrant control valve system has a particularly high degree of freedom in terms of its technical design, depending on how many control valves are actually required, and also in terms of the individual control and regulation of the individual control valves when fully equipped with four control valves. This allows particularly efficient control valve systems to be implemented on the one hand and particularly flexible implementation of complex control and regulation requirements on the other.

Circuit diagram synthesis in the present case means the, preferably automated, creation of a hydraulic circuit diagram for the quadrant control valve system. A preferably automated role assignment for each control valve also means that, based on the automated quadrant-based load case analysis, each control valve is assigned, preferably automatically, a specific role (for example: fully open, fully closed, regulating) for each load case that occurs. Both the automated circuit diagram synthesis and the automated role assignment are carried out, for example, on the basis of a lookup table or a library in which the corresponding combinations of load cases, circuit diagrams and roles are stored or using machine learning methods.

Controller synthesis is the configuration of a controller for each control valve present in the quadrant control valve system. Such a controller synthesis can be automated using machine learning methods. For example, based on the requirement data, the quadrant-based load case analysis, the synthesized circuit diagram and/or the role assignment for each control valve, the behavior of the entire hydraulic system is identified using a computer-based model structure and system equations of the entire hydraulic system are extracted. In turn, a corresponding controller can be automatically synthesized from the extracted system equations. For example, an ANARX structure (additive nonlinear autoregressive exogenous model), an LSTM structure (long short-term memory), an ARMA structure (autoregressive-moving-average) and/or an RNN structure (recurrent neural network) can be used as a computer-based model structure.

The implementation of the synthesized circuit diagram refers to the hardware implementation of the quadrant control valve system.

The implementation of the synthesized controller refers to the software-side embedding of the synthesized controller in the electronic valve controller. The electronic valve controller can either comprise a central electronic valve controller for all control valve arrangements of the quadrant control valve system or a large number of electronic valve controllers for individual control valve arrangements or even individual control valves.

It should also be noted that, according to the present disclosure, a control valve arrangement can also control two or more hydraulic consumers simultaneously (for example in the case of a lifting device with four lifting cylinders, which are controlled via a common control valve arrangement). However, each hydraulic consumer to be controlled is assigned a control valve arrangement for controlling the respective hydraulic consumer.

The method according to the disclosure demonstrates a holistic approach to implementing a quadrant control valve system in the most automated way possible.

In one aspect, the result of the automated quadrant-based load case analysis reflects all load cases occurring in the hydraulic system and all transitions between the load cases in a four-quadrant field for each hydraulic consumer, whereby the four quadrants each reflect a unique combination of positive or negative load and positive or negative movement of the corresponding hydraulic consumer in a two-axis coordinate system. Positive and negative loads are, for example, pushing and pulling loads. Positive and negative movements of the hydraulic consumer include, for example, the extension and retraction of a hydraulic cylinder or the rotation of a hydraulic motor in a first and second direction. In this way, all occurring load cases and all transitions between load cases can be reflected for each hydraulic consumer in a four-quadrant field. On this basis, it is possible to automatically select how many control valves are required per hydraulic consumer and which roles the respective control valves must fulfill for each load case.

In the event that the hydraulic system comprises at least two hydraulic consumers that are operated exclusively sequentially, an automated load case analysis can be carried out separately for each hydraulic consumer. In the alternative case that the hydraulic system comprises at least two hydraulic consumers that are also operated in parallel, it is preferable if an automated load case analysis is carried out separately for each hydraulic consumer and, in addition, an automated load case analysis is carried out for each case in which at least two hydraulic consumers are operated in parallel. In the event that hydraulic consumers are operated in parallel, it is possible to recover energy by using special circuit diagram architecture. In other words, for example, energy from one hydraulic consumer that is usually converted into heat (i.e. lost) as part of throttle control can be used to operate another hydraulic consumer.

In one aspect, the hydraulic diagram synthesis is performed in an automated manner and comprises an automated selection of a number of required control valves for each control valve assembly. By default, a single control valve assembly of the quadrant control valve system comprises four control valves. However, since there are also simple applications in which not all four control valves are required, it is preferable if the number of control valves actually required for each control valve arrangement is selected as part of the automated circuit diagram synthesis. This reduces both manufacturing costs and system complexity.

Furthermore, each control valve might be an electromagnetically (or electrohydraulically) actuated 2/2-way control valve, which might be configured as a valve cartridge. Each control valve arrangement may comprise at least two control valves and particularly preferably four control valves. In particular, each control valve is a proportional electromagnetically actuated 2/2-way control valve. The use of exclusively electromagnetically actuated 2/2-way control valves simplifies the system architecture and allows the flexible use of standardized components. By using four electromagnetically actuated 2/2-way control valves in a single control valve arrangement, the control valve arrangement in question can control every conceivable hydraulic consumer and precisely and reliably adjust the desired operating points with a high degree of flexibility.

In one aspect, the requirement data of the hydraulic system includes measurement and/or simulation data of the hydraulic system. Optionally, specific customer requirements, such as specific specifications regarding energy efficiency or maximum energy consumption of the hydraulic system to be controlled at certain operating points, can also be part of the requirement data. This means that even complex customer specifications can be automatically implemented in a formed quadrant control valve system.

In one aspect, the method further comprises the following subsequent steps:

reading out sensor data recorded and stored during operation of the quadrant control valve system and optimizing the role assignment of the individual control valves and the synthesized controller based on the recorded and stored sensor data.

By reading out sensor data recorded and stored during the operation of the quadrant control valve system, the optimization is carried out on the basis of real measurement data from the formed quadrant control valve system and thus on a database that is as accurate and realistic as possible. Accordingly, a more comprehensive database is available in the optimization step, especially for the controller synthesis, which leads to an even better result in the controller synthesis. Additionally or alternatively, the optimization step can also be based on modified or new requirement data of the hydraulic system. This makes it possible to subsequently adapt the formed quadrant control valve system to changed environmental conditions, signs of wear or even changed customer requirements as part of an update.

Furthermore, the subsequent steps of reading out and optimizing may also be carried out automatically during operation of the quadrant control valve system. Preferably, the subsequent steps are carried out automatically by the valve controller of the quadrant control valve system. This can be done either continuously or at predetermined intervals. This results in a fully self-learning, adaptive quadrant control valve system that adjusts itself (and in particular the implemented synthesized controllers) independently to changing environmental conditions and/or signs of wear.

In some aspects, the automated steps of the method may be computer-based using machine learning methods. The machine learning methods may comprise convolutional neural networks (CNNs), transformer models, recurrent neural networks (RNNs) and/or knowledge-based methods. Knowledge-based methods can also be referred to as "rule-based systems" or "expert systems". These form a sub-area of artificial intelligence/machine learning. In knowledge-based methods, recommendations for action and/or conclusions are derived from an existing knowledge base, which is usually created and maintained by experts. Fixed rule-based systems, which use "if-then" queries to influence decision-making, are a simple example. Another example is decision trees. In contrast to neural networks, decision-making with knowledge-based methods is relatively transparent and comprehensible. In this case, knowledge-based methods could be used for automated circuit diagram synthesis, for example. For example, many different versions of (partial) circuit diagrams and corresponding roles of the respective control valves would be stored in a library/lookup table. Automated circuit diagram synthesis could be carried out on this basis using fixed rules in combination with given requirement data.

According to the present disclosure, a quadrant control valve system for a hydraulic system is provided. The hydraulic system comprises at least one hydraulic consumer which is controlled via the quadrant control valve system. The quadrant control valve system comprises a control valve arrangement for each hydraulic consumer of the hydraulic system to be controlled, a control valve sensor system and an electronic valve controller. The quadrant control valve system is formed according to a method described above. In some aspects, the control valve sensor system is integrated in the individual control valves.

The quadrant control valve system according to the present disclosure provides an automatically implemented, adaptive control valve system.

In some aspects, the quadrant control valve system also comprises a memory unit in which the sensor data recorded by the control valve sensor system during operation of the quadrant control valve system is stored. In this way, the subsequent optimization steps can be implemented simply and automatically during operation or as part of an update process on the quadrant control valve system.

FIG. 1 shows the schematic circuit diagram of a hydraulic system 100 according to a first exemplary embodiment. The hydraulic system 100 comprises a hydraulic pump 10, a hydraulic consumer 12 configured in this exemplary embodiment as a hydraulic motor, a quadrant control valve system V1 with a control valve arrangement SVA1, which comprises a control valve SV, and a tank 14. As noted above, while the hydraulic consumer 12 is depicted as a hydraulic motor in FIG. 1, it should be appreciated that the hydraulic consumer 12 may be any other hydraulic consumer such as, for example, a cylinder (e.g., a hydraulic cylinder). As can be seen in FIG. 1, the control valve SV in the present case is a proportional electromagnetically actuated 2/2-way control valve with an electromagnetic actuator 16 and a return spring 18, which biases the control valve SV into its closed initial position. Furthermore, two pressure sensors PS are integrated into the control valve SV, only one of which is shown schematically in FIG. 1. The pressure sensors PS are part of a control valve sensor system of the quadrant control valve system V1 and detect the pressures upstream and downstream of the control edge of the control valve SV. In addition, the quadrant control valve system V1 comprises an electronic valve control C1 and a memory unit M1.

The hydraulic system 100 of the first exemplary embodiment describes the configuration of a hydraulic cable winch, wherein the hydraulic consumer 12 (e.g., the hydraulic motor) actuates the cable winch and the quadrant control valve system V1 controls the flow rate flowing from the hydraulic pump 10 via the hydraulic consumer 12.

Figure 2:
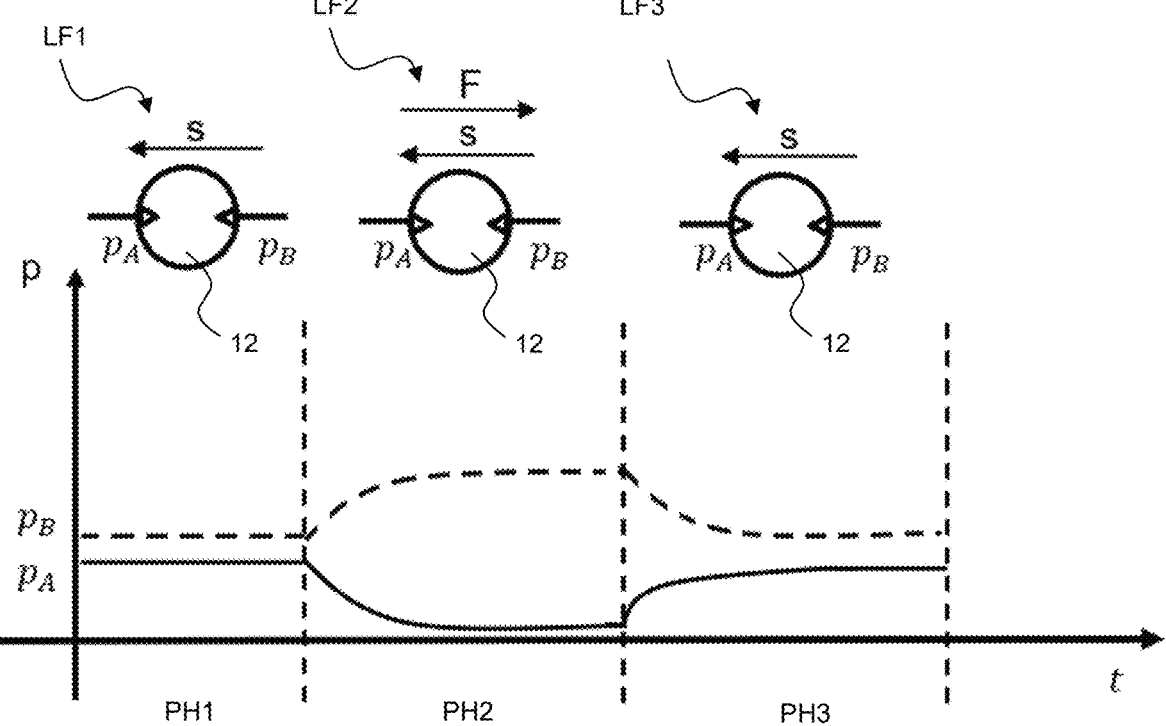
FIG. 2 depicts exemplary load cases for the first exemplary embodiment according to FIG. 1.

FIG. 2 exemplarily depicts the load cases occurring in the hydraulic system 100 and their transitions in three phases PH1, PH2 and PH3. The pressures upstream and downstream of the hydraulic consumer 12 ($p_A$ and $p_B$) are plotted over time t in a diagram. For each of the three phases PH1, PH2 and PH3, both a direction of movement s of the hydraulic consumer 12 and a force F acting against the direction of movement s are shown.

In the present case, the hydraulic system 100 is therefore configured exclusively for the hydraulic consumer 12 (the cable winch) to pull a load (represented by the force F) in the direction of movement s.

The three phases PH1, PH2 and PH3 in FIG. 2 correspond to three load cases. In the first load case LF1 and in the third load case LF3 in phases PH1 and PH2, the hydraulic consumer 12 is rotated in the direction of movement s without a load being applied. The load cases LF1 and LF3 are therefore identical in this case. In the second load case LF2 in phase PH2, the hydraulic consumer 12 rotates in the direction of movement s and pulls a load, which is represented by the force F. The p/t diagram in FIG. 2 clearly shows how the pressures $p_A$ and $p_B$ upstream and downstream of the hydraulic consumer 12 differ during the individual phases PH1 to PH3 and also how the transitions of the pressure curves between the individual phases PH1 to PH3 are represented.

Figure 3:
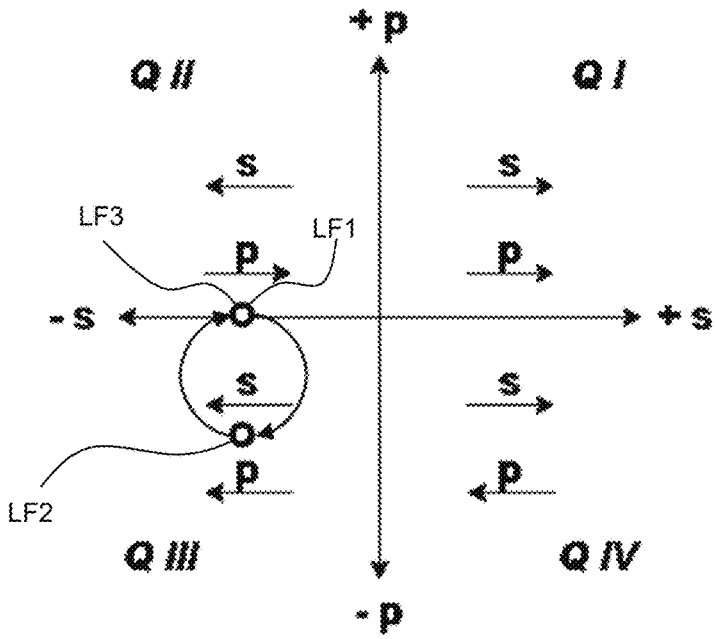
FIG. 3 depicts a four-quadrant field for the load cases shown in FIG. 2.

FIG. 3 shows the load cases LF1 to LF3 illustrated in FIG. 2 in a four-quadrant field. The four-quadrant field consists of a first quadrant QI, a second quadrant QII, a third quadrant QIII and a fourth quadrant QIV. The direction of movement s of the hydraulic consumer 12 is plotted on the abscissa of the four-quadrant field. A load p, which acts on the hydraulic consumer 12, is plotted on the ordinate.

As can be seen in FIG. 3, the first load case LF1 and the third load case LF3 correspond to a point on the abscissa between the second quadrant QII and the third quadrant QIII. In this case, no load p is applied, but the hydraulic consumer 12 rotates in such a way that the cable winch is pulled in (negative direction of movement s). The second load case LF2, on the other hand, corresponds to a point in the third quadrant QIII. Here, the hydraulic consumer 12 rotates in such a way that the cable winch is pulled in and at the same time the force F pulls on the cable winch (negative load p).

As can be seen in FIG. 3, there are no transitions between the individual quadrants QI to QIV in the four-quadrant field, which represents the three load cases LF1 to LF3 of the hydraulic system 100 of the first exemplary embodiment (cable winch), at the transition between the individual load cases LF1 to LF3. From the four-quadrant field for the hydraulic system 100 shown in FIG. 3, it is therefore possible in principle to draw direct conclusions about the form of the quadrant control valve system V1 with only one control valve SV (simplest form of a quadrant control valve system) shown in FIG. 1.

Figure 4:
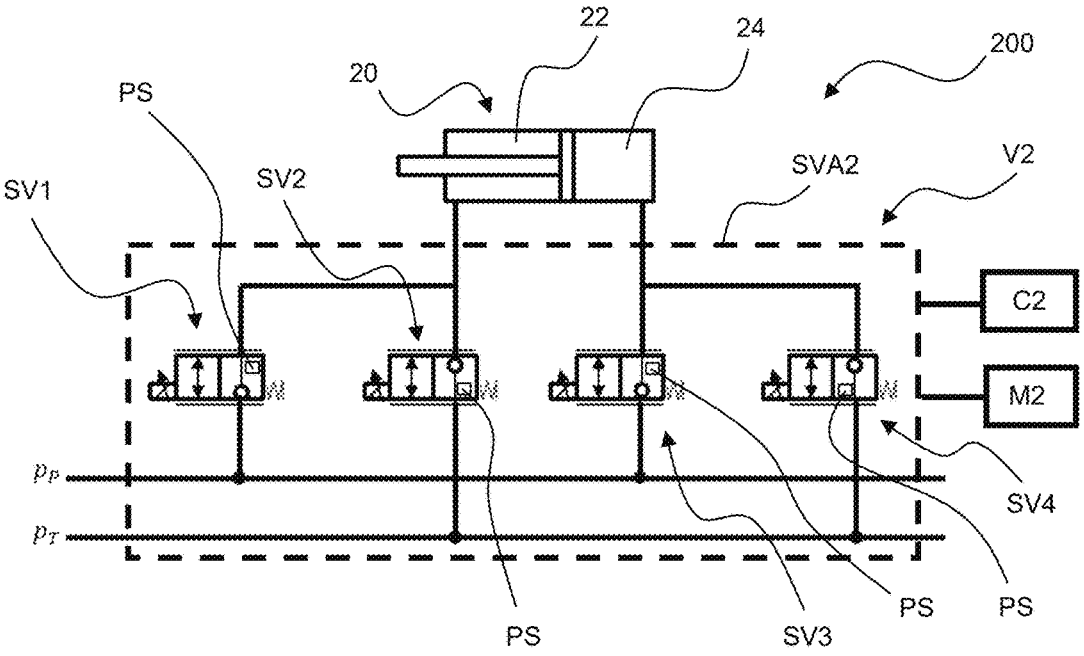
FIG. 4 shows a circuit diagram of a hydraulic system according to a second exemplary embodiment.

FIG. 4 shows the schematic circuit diagram of a hydraulic system 200 according to a second embodiment. The hydraulic system 200 comprises a hydraulic pump (not shown), a a hydraulic consumer being configured as a hydraulic cylinder 20, a quadrant control valve system V2 with a control valve arrangement SVA2, and a tank (not shown). The control valve arrangement SVA2 comprises a first control valve SV1, a second control valve SV2, a third control valve SV3 and a fourth control valve SV4. As can be seen in FIG. 4, the control valves SV1 to SV4 are identical to the control valve SV of the first embodiment, which is why no further details are given here. In addition, the quadrant control valve system V2 comprises an electronic valve control C2 and a memory unit M2.

In the hydraulic system 200 according to the second exemplary embodiment, the first control valve SV1 controls the inflow of hydraulic fluid from the pump (see pp in FIG. 4) to a rod side 22 of the hydraulic cylinder 20. The second control valve SV2 controls the outflow of hydraulic fluid from the rod side 22 of the hydraulic cylinder 20 in the direction of the tank (see pr in FIG. 4). The third control valve SV3 controls the inflow of hydraulic fluid from the pump to a piston side 24 of the hydraulic cylinder 20. The fourth control valve SV4 controls the outflow of hydraulic fluid from the piston side 24 of the hydraulic cylinder 20 in the direction of the tank.

Figure 5:
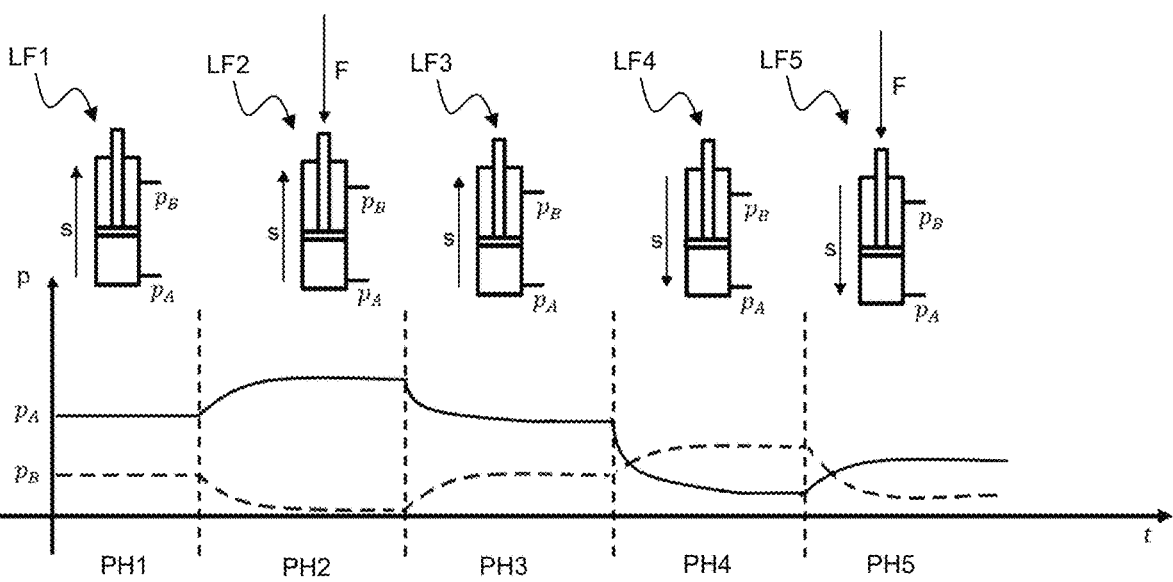
FIG. 5 depicts exemplary load cases for the second exemplary embodiment according to FIG. 4.

The hydraulic system 200 corresponds schematically to the lifting device of a forklift truck. The corresponding load cases LF1 to LF5 are shown in FIG. 5. FIG. 5 also shows the curves of the pressures $p_A$ (here: pressure on the piston side 24) and $p_B$ (here: pressure on the rod side 22) over the individual load cases in five phases PH1 to PH5. The first load case LF1 and the third load case LF3 correspond to an extension of the hydraulic cylinder 20 without load. The second load case LF2 corresponds to an extension of the hydraulic cylinder 20 with load (see force F in FIG. 5, which is opposite to the direction of movement s). The fourth load case LF4 corresponds to a retraction of the hydraulic cylinder 20 without load. The fifth load case LF5 corresponds to retraction of the hydraulic cylinder 20 under load (see force F in the direction of movement s in FIG. 5).

Figure 6:
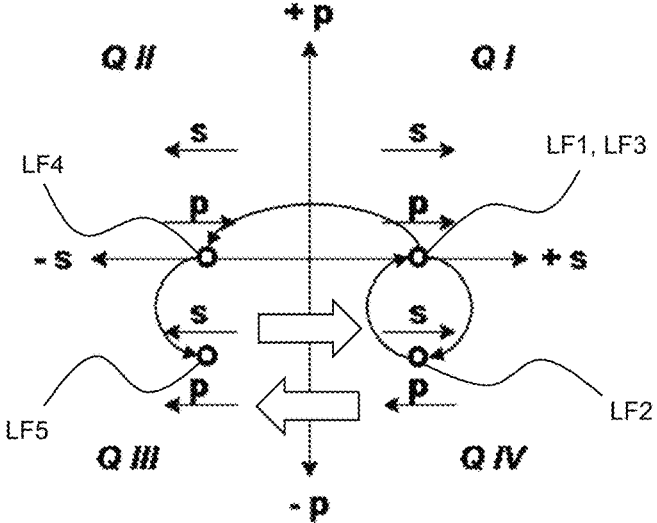
FIG. 6 depicts a four-quadrant field for the load cases shown in FIG. 5.

In FIG. 6, the load cases LF1 to LF5 of the hydraulic system 200 shown in FIG. 5 are again shown in a four-quadrant field. The first and third load cases LF1 and LF3 correspond to the same point on the abscissa between the first quadrant QI and the fourth quadrant QIV of the four-quadrant field (positive direction of movement s, extension of the hydraulic cylinder 20, no load p). The second load case LF2 corresponds to a point in the fourth quadrant QIV (positive direction of movement s, negative load p). The fourth load case LF4 corresponds to a point on the abscissa between the second quadrant QII and the third quadrant QIII (negative direction of movement s, retraction of hydraulic cylinder 20, no load). The fifth load case LF5 corresponds to a point in the third quadrant QIII of the four-quadrant field (negative direction of movement, negative load p).

As also shown in FIG. 6, load transitions between the third quadrant QIII and the fourth quadrant QIV are therefore possible in the hydraulic system 200. For example, it is possible to transition directly from the second load case LF2 (extension of the hydraulic cylinder 20 with a pressing load p) to the fifth load case LF5 (retraction of the hydraulic cylinder 20 with a pressing load p) and vice versa. From the four-quadrant field for the hydraulic system 200 shown in FIG. 6, it is therefore possible in principle to directly deduce the form of the quadrant control valve system V2 with four control valves SV1 to SV4 (standard form of a quadrant control valve system) shown in FIG. 4.

Figure 7:
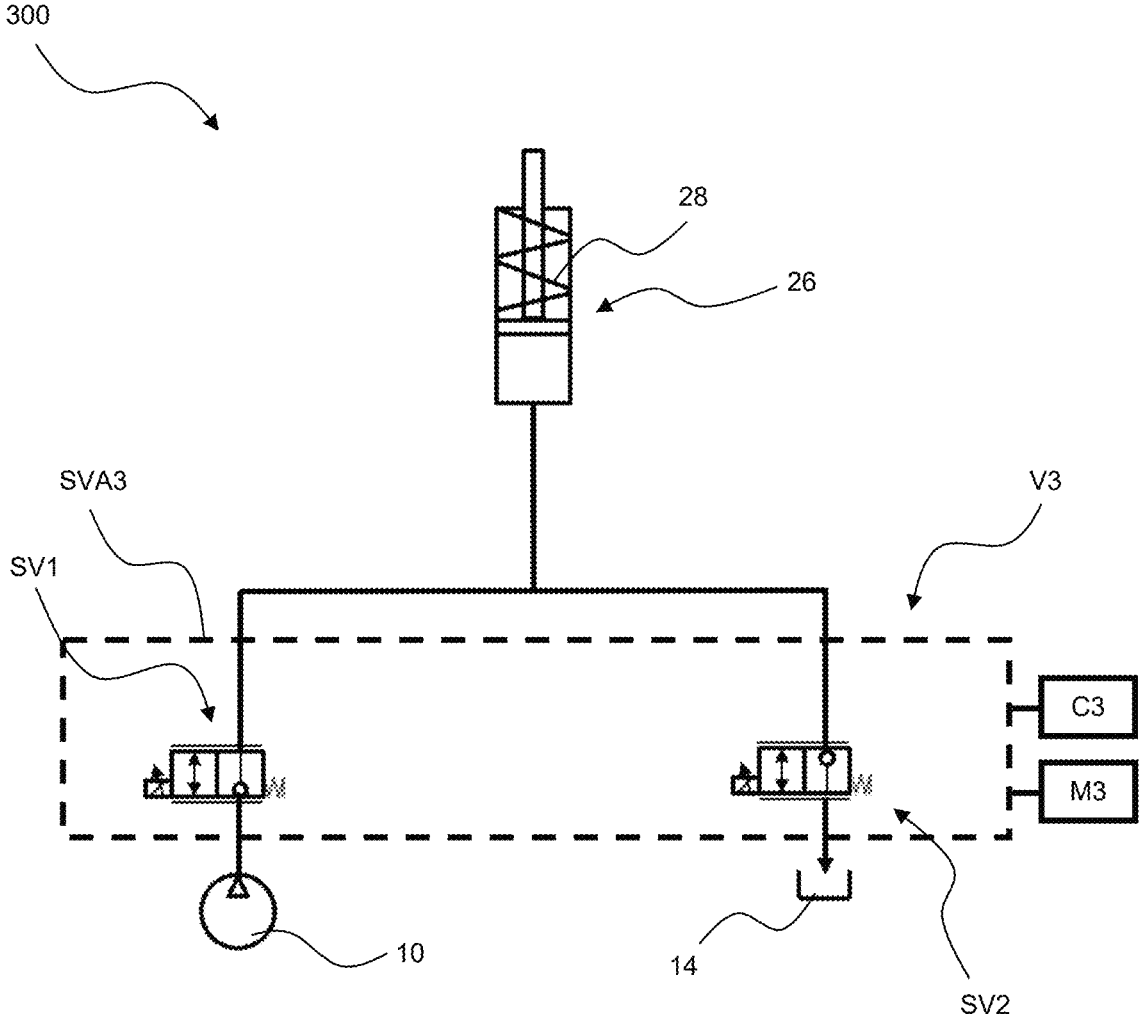
FIG. 7 shows a circuit diagram of a hydraulic system according to a third exemplary embodiment.

FIG. 7 shows an exemplary circuit diagram of a hydraulic system 300 according to a third exemplary embodiment with a quadrant control valve system V3 with a control valve arrangement SVA3, which comprises a first control valve SV1 and a second control valve SV2, a hydraulic pump 10, a single-acting hydraulic cylinder 26 with automatic return via a return spring 28 and a tank 14. The hydraulic system 300 corresponds, for example, to the control of a variable displacement cylinder of an axial piston variable displacement pump. As can be seen in FIG. 7, the control valve arrangement SVA3 of the quadrant control valve system V3 only requires two control valves SV1 and SV2 to control the piston-side inlet and outlet of the single-acting hydraulic cylinder 26. The quadrant control valve system V3 also comprises an electronic valve controller C3 and a memory unit M3, which are shown schematically in FIG. 7.

Figure 8:
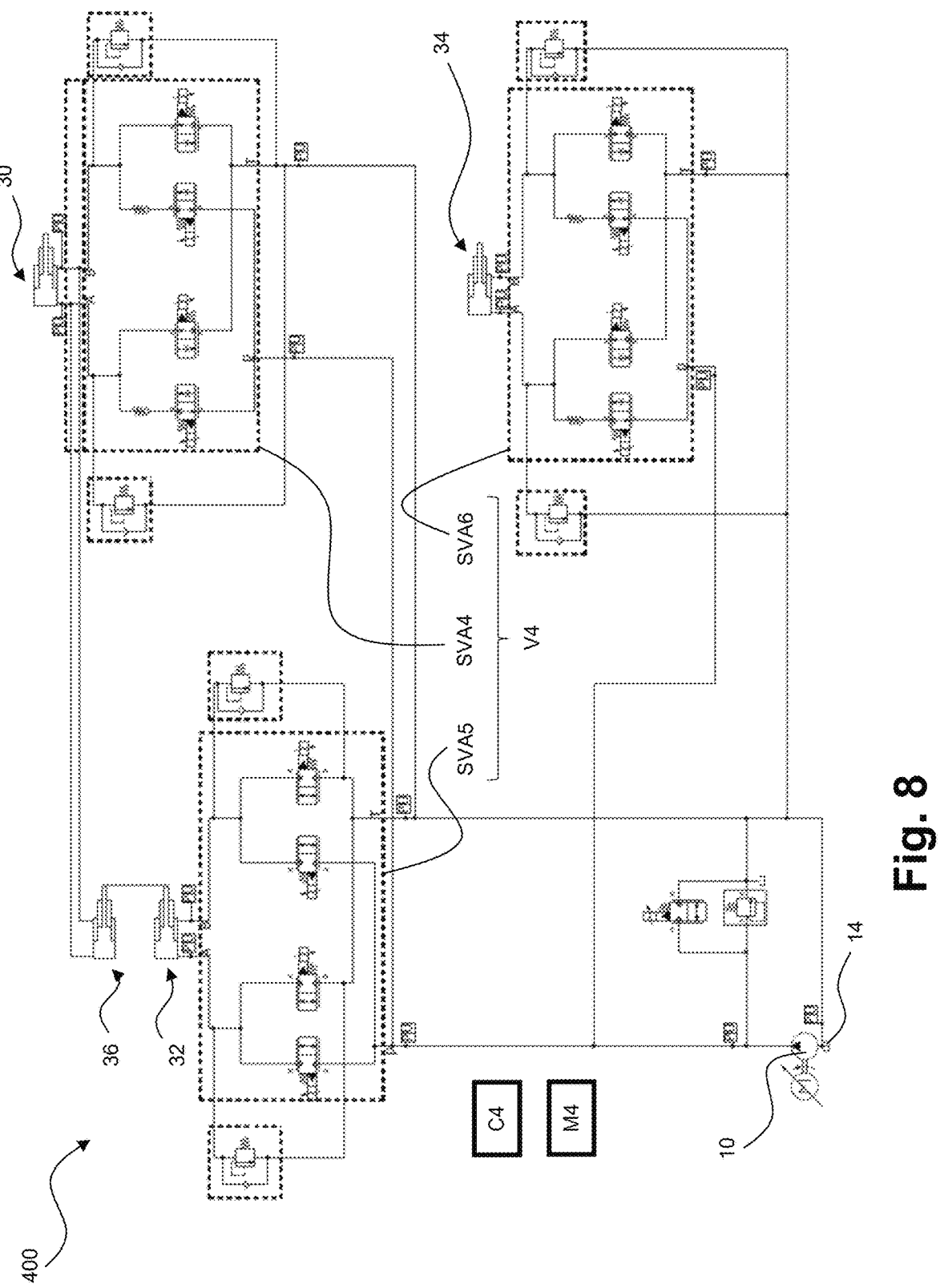
FIG. 8 shows a circuit diagram of a hydraulic system according to a fourth exemplary embodiment.

FIG. 8 shows an exemplary circuit diagram of a hydraulic system 400 according to a fourth exemplary embodiment with a quadrant control valve system V4, a hydraulic pump 10, a tank 14 and several hydraulic cylinders 30, 32, 34, 36 as hydraulic consumers. Specifically, the hydraulic system 400 corresponds to the configuration of a telescopic arm truck with a tilt cylinder 30, a lift cylinder 32, a telescopic cylinder 34 and a compensation cylinder 36. In this case, the tilt cylinder 30, the lift cylinder 32 and the telescopic cylinder 34 represent hydraulic consumers of the hydraulic system 400 to be controlled, which are each controlled via a control valve arrangement SVA4, a control valve arrangement SVA5 and a control valve arrangement SVA6 of the quadrant control valve system V4. The control valve arrangements SVA4, SVA5 and SVA6 each comprise four control valves which, for the sake of clarity, are not designated in more detail in FIG. 8. The quadrant control valve system V4 also comprises an electronic valve controller C4 and a memory unit M4, which are shown schematically in FIG. 8. For the sake of clarity, no connections between the electronic valve controller C4 and the other components of the quadrant control valve system V4 are shown. The same applies to the memory unit M4.

Figure 9:
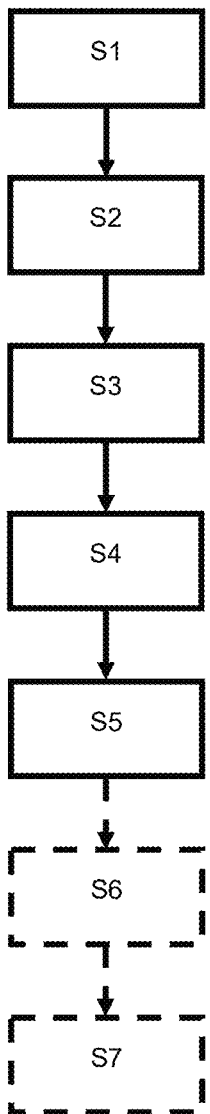
FIG. 9 shows a simplified block diagram of a method according to the present disclosure.

With reference to FIG. 9, a method according to the disclosure for forming a quadrant control valve system for a hydraulic system is now described. The method described can be applied to all the quadrant control valve systems V1 to V4 for the hydraulic systems 100 to 400 described above by way of example. The hydraulic systems 100 to 400 essentially serve to illustrate different degrees of complexity of quadrant control valve systems. For the sake of simplicity, the following description of the method according to the disclosure refers to the quadrant control valve system V2 according to the exemplary embodiment shown in FIG. 4 to FIG. 6 for the hydraulic system 200.

The method according to the disclosure essentially comprises steps S1 to S5 and optionally further comprises steps S6 and S7. Steps S1 to S3 are carried out in a computer-based manner using machine learning methods.

In step S1, an automated load case analysis of the entire hydraulic system 200 to be controlled is carried out on the basis of requirement data of the hydraulic system 200. In the present case, the requirement data comprises measurement and/or simulation data of the hydraulic cylinder 20, as shown by way of example in FIG. 5. The result of the automated quadrant-based load case analysis of step S1 corresponds to the four-quadrant field for the load cases of the hydraulic system 200 shown as an example in FIG. 6.

In step S2, an automated hydraulic diagram synthesis is performed for the quadrant control valve system V2 based on the quadrant-based load case analysis. The circuit diagram synthesis comprises an automated role assignment for each control valve SV1, SV2, SV3 and SV4 of the control valve arrangement SVA2 on the basis of the quadrant-based load case analysis. Specifically, the role assignment for the load cases LF1 to LF5 shown schematically in FIG. 5 with reference to the control valves SV1 to SV4 has the following result: When the hydraulic cylinder 20 is extended (load cases LF1 to LF3), the third control valve SV3 controls the supply of hydraulic fluid to the piston side 24 of the hydraulic cylinder 20 from the pump. The second control valve SV2 is fully open in the load cases LF1 to LF3 in order to relieve the rod side 22 in the direction of the tank. The first control valve SV1 and the fourth control valve SV4, on the other hand, are fully closed during extension (load cases LF1 to LF3). When retracting the cylinder (load cases LF4 and LF5), there is a risk that the pressing load according to load case LF4 will additionally accelerate the hydraulic cylinder 20 in its downward movement. To prevent this, the retraction of the hydraulic cylinder 20 is controlled via the fourth control valve SV4 in accordance with load cases LF4 and LF5. When the hydraulic cylinder 20 is retracted, the first control valve SV1, which controls the inflow from the pump to the rod side 22 of the hydraulic cylinder, is fully open. The speed of the hydraulic cylinder 20 is controlled solely by the degree of opening of the fourth control valve SV4. The second control valve SV2 and the third control valve SV3 are fully closed when the hydraulic cylinder 20 is retracted.

In step S3, an automated controller synthesis for the quadrant control valve system V2 is performed based on the synthesized circuit diagram and the role assignment from step S2.

In step S4, the synthesized circuit diagram of the quadrant control valve system V2 according to FIG. 4 is converted into hardware.

In step S5, in turn, the controller synthesized in step S3 is implemented in the electronic valve controller C2 of the quadrant control valve system V2.

During operation of the quadrant control valve system V2 in the hydraulic system 200, the memory unit M2 stores all sensor data recorded by the control valve sensors of the quadrant control valve system V2. In particular, this is the sensor data of the pressure sensors PS integrated in the control valves SV1 to SV4.

In step S6, the sensor data recorded during operation of the quadrant control valve system V2 and stored in the memory unit M2 is read out.

In step S7, the role assignment of the individual control valves SV1 to SV4 and the synthesized controller in the electronic valve controller C2 are optimized on the basis of the recorded and stored sensor data.

The invention claimed is:

1. A method of forming a quadrant control valve system for a hydraulic system comprising at least one hydraulic consumer controllable via the quadrant control valve system, the method comprising:

performing an automated quadrant-based load case analysis of an entire hydraulic system to be controlled on a basis of requirement data of the hydraulic system;

performing a hydraulic circuit diagram synthesis for the quadrant control valve system based on the automated quadrant-based load case analysis, wherein the hydraulic diagram synthesis comprises a role assignment for each control valve of each control valve arrangement in the at least one hydraulic consumer based on the automated quadrant-based load case analysis;

performing a controller synthesis for the quadrant control valve system based on the synthesized hydraulic circuit diagram and role assignment;

implementing the synthesized circuit diagram of the quadrant control valve system;

implementing the synthesized controller in an electronic valve controller of the quadrant control valve system; and controlling at least one hydraulic consumer via the quadrant control valve system.

2. The method according to claim 1, wherein a result of the automated quadrant-based load case analysis reflects all load cases occurring in the hydraulic system and all transitions between the load cases in each case in a four-quadrant field per hydraulic consumer, whereby the four quadrants each represent a unique combination of positive or negative load and positive or negative movement of the corresponding hydraulic consumer.

3. The method according to claim 1, wherein the hydraulic system comprises at least two hydraulic consumers which are operated exclusively sequentially, wherein an automated load case analysis is carried out separately for each hydraulic consumer.

4. The method according to claim 1, wherein the hydraulic system comprises at least two hydraulic consumers, which are also operated in parallel, wherein an automated load case analysis is carried out separately for each hydraulic consumer and an automated load case analysis is additionally carried out for each case in which at least two hydraulic consumers are operated in parallel.

5. The method according to claim 1, wherein the hydraulic circuit diagram synthesis is performed automatically and includes automated selection of a number of required control valves for each control valve arrangement.

6. The method according to claim 1, wherein each control valve is an electromagnetically actuated 2/2-way control valve and each control valve arrangement comprises at least two control valves.

7. The method according to claim 1, wherein the requirement data of the hydraulic system comprise measurement data and/or simulation data.

8. The method according to claim 1, further comprising:

reading out of sensor data recorded and stored during operation of the quadrant control valve system; and optimizing the role assignment of individual control valves of the hydraulic consumer and the synthesized controller based on the recorded and stored sensor data.

9. The method according to claim 8, wherein reading out and optimizing are carried out automatically during operation of the quadrant control valve system.

10. The method according to claim 1, wherein the method is computer-based using a machine learning method.

11. The method according to claim 10, wherein the machine learning method includes convolutional neural networks, transformer models, recurrent neural networks and/or knowledge-based methods.

12. A quadrant control valve system for a hydraulic system, wherein the hydraulic system comprises at least one hydraulic consumer which is controlled via the quadrant control valve system, wherein the quadrant control valve system comprises a control valve arrangement for each hydraulic consumer of the hydraulic system to be controlled, a control valve sensor system and an electronic valve controller, wherein the quadrant control valve system is formed according to the method of claim 1.

13. The quadrant control valve system according to claim 12, wherein the quadrant control valve system further comprises a memory unit in which sensor data recorded by the control valve sensor system during operation of the quadrant control valve system is stored.

14. A hydraulic system comprising at least one hydraulic consumer and the quadrant control valve system according to claim 12.

* * * * *